Nov. 28, 1967  R. C. WILLIAMS  3,354,837
EQUALIZING SPRING BOLSTER FOR RAILROAD CARS
Filed Dec. 21, 1964  3 Sheets-Sheet 1
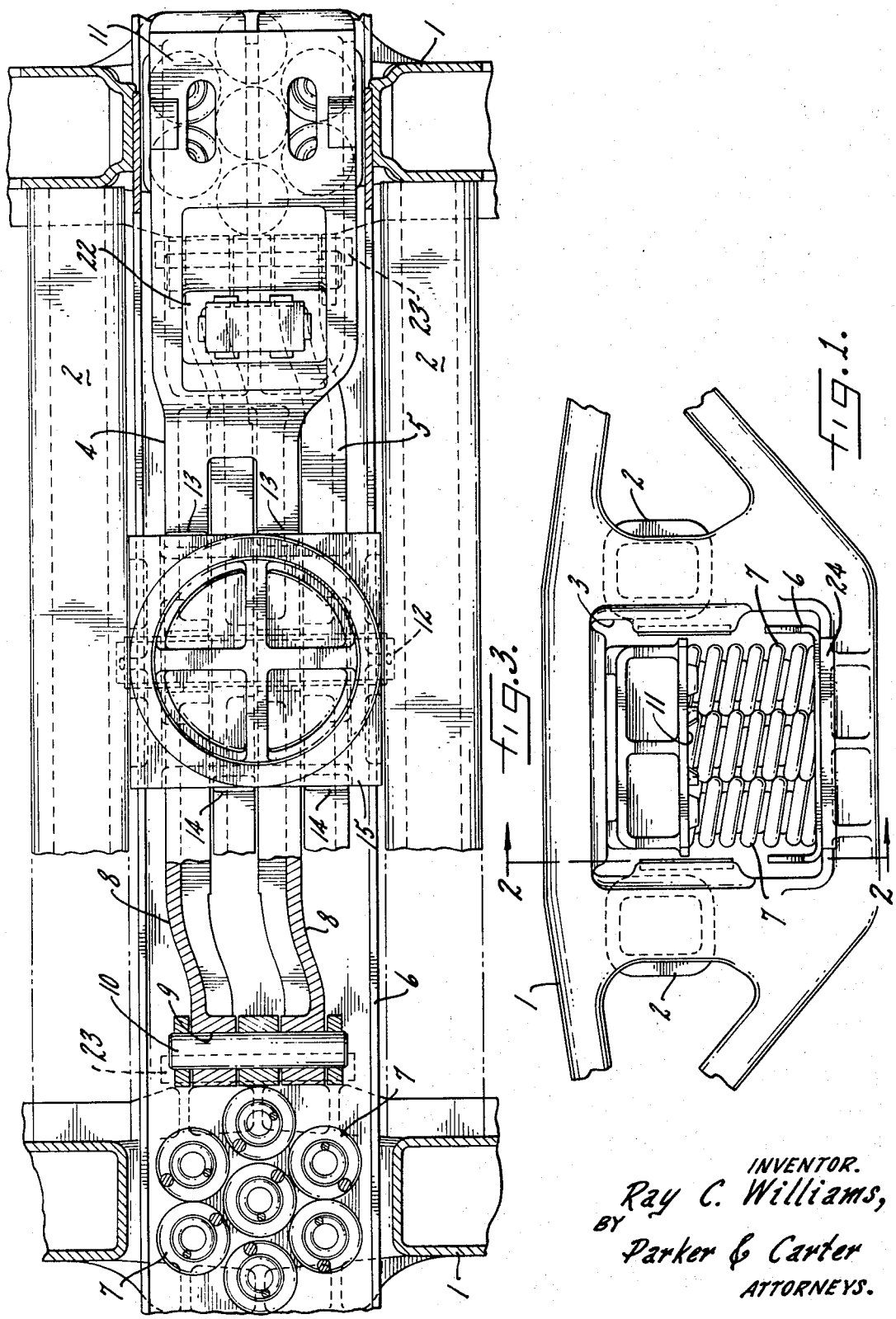
INVENTOR.
Ray C. Williams,
BY Parker & Carter
ATTORNEYS.

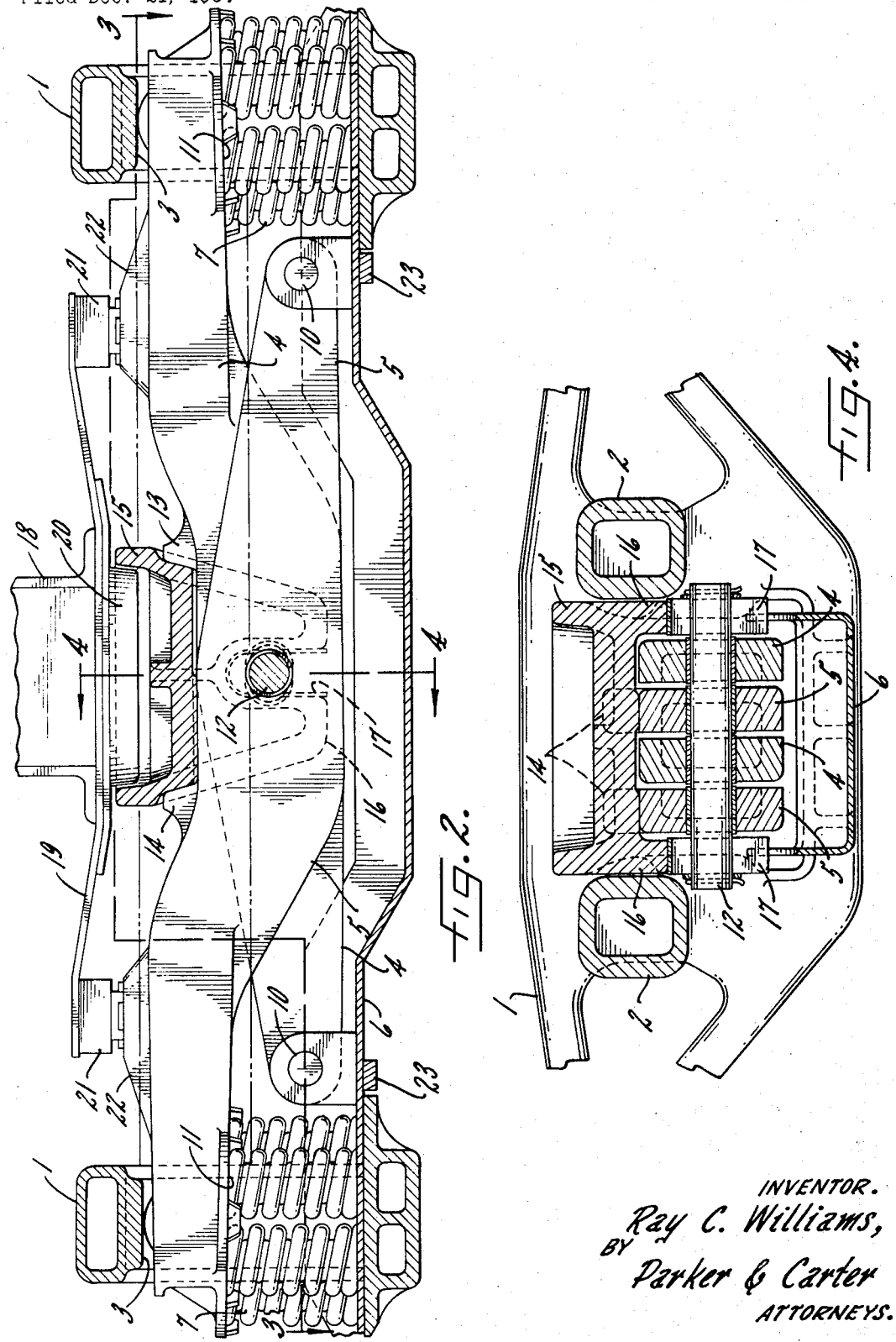

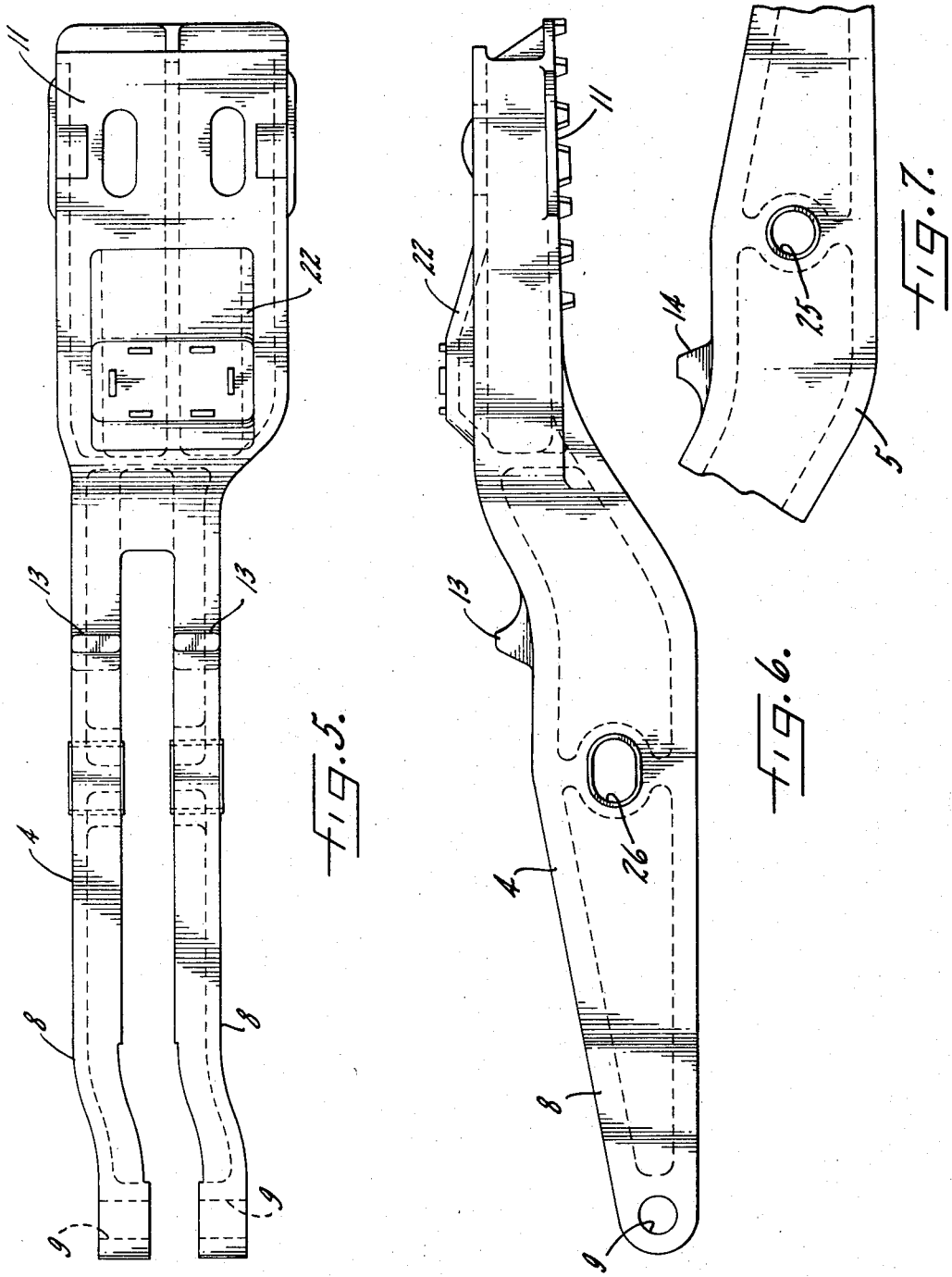

United States Patent Office 3,354,837
Patented Nov. 28, 1967

3,354,837
EQUALIZING SPRING BOLSTER FOR RAILROAD CARS
Ray C. Williams, Chicago, Ill., assignor to Standard Car Truck Company, Chicago, Ill., a corporation of New Jersey
Filed Dec. 21, 1964, Ser. No. 419,646
6 Claims. (Cl. 105—197)

ABSTRACT OF THE DISCLOSURE

The load of the railroad car is applied to the truck frame by scissors bolster elements respectively upwardly inclined from one truck frame to the other with load applying elements between the car body and each scissors bolster at a point far removed from the center of the truck but adjacent to the side frames; a center plate, carrying no load, is interposed between the truck and the car for the sole purpose of holding the two in proper pivotal relation.

---

This invention relates to equalizing bolster for railroad car trucks and has for one object to provide means for providing points of support for the car body on the car truck on both sides of the car widely spaced from the center of gravity.

This application covers a modification of copending application Serial No. 391,138 filed August 21, 1964, and differs from it in that the car truck frames are tied together by parallel transom members and the female truck center member is supported by the scissors bolsters and held against horizontal displacement by the bolsters and the transom members so that no car load can be applied through the center members.

Another object of the invention is to cause the floating scissors bolster members both to carry the load of the car at points widely spaced from the center plate and to support and position the truck center plate for cooperation with the car center plate.

Other objects will appear from time to time throughout the specification and claims.

The invention is illustrated more or less diagrammatically in the accompanying drawings, wherein—

FIGURE 1 is a side elevation with parts in section and parts omitted of a railroad car truck;

FIGURE 2 is a section along the line 2—2 of FIGURE 1 with parts omitted;

FIGURE 3 is a section along the line 3—3 of FIGURE 2;

FIGURE 4 is a section along the line 4—4 of FIGURE 2;

FIGURE 5 is a plan view of one bolster half-section;

FIGURE 6 is a side elevation of the scissors bolster of FIGURE 5;

FIGURE 7 is a partial side elevation of the other half-section of the scissors bolster;

Like parts are indicated by like characters throughout the specification and drawings.

A railroad car truck includes two parallel spaced truck frames 1, joined by spaced transoms 2 which extend across the truck and maintain the truck frames in correct working alignment. Each truck frame is windowed as at 3, the transoms being on each side of the windows. Intersecting, inclined scissors bolster half-sections 4 and 5 extend across between the two truck frames in the area bounded by the two transoms. Each scissor bolster half is pivoted at its lower end on a spring plank 6 which extends through the frame window inwardly to support the downward end of one of the bolsters. Load supporting springs 7 in the truck frame windows rest upon the spring plank. The upper end of each bolster penetrates the window of the frame on the opposite side of the truck with respect to the frame containing the spring plank on which it is pivoted and rests upon the load supporting springs.

The scissors bolster halves are identical. Each includes a pair of spaced offset arms 8 apertured at 9 to receive spring plank pivot pin 10 by which the lower end of the bolster is connected to the spring plank. The arms 8 are joined at the upper end of each scissors bolster half by a generally flat spring engaging plate 11 extending into the window of the truck frame and resting upon the load supporting springs.

In position, the two scissors bolster halves are reversed, one interlocking with the other as shown in FIGURES 2, 3 and 4.

The bolster arms where they cross each other are pivoted on a bolster center pin 12, the usual anti-friction bearings being interposed between the bolster arms and the pin. Upwardly extending from each scissors bolster sections 4 and 5 are stop lugs 13 and 14 respectively on either side of the vertical plane passing through the bolster center pin 12.

A female center plate saddle 15 rests upon the bolster sections 4 and 5 and is held against transverse movement with respect to the truck frame by the stop lugs 13 and 14 and against longitudinal movement parallel with the truck side frames by the transoms 2. The saddle has two downwardly extending ears 16, one adjacent each transom, slotted at 17 to engage the center pin 12 so that the pivot point of the scissors bolster is free to be vertically displaced with respect to the saddle but is held against horizontal movement. A railroad car center sill 18 carries the car body bolster 19 from which depends downwardly a male center plate 20 to penetrate a female center plate in the saddle 15.

The car body bolster extends transversely of the center sill and terminates at each end in the side bearings 21 which rest upon bearing bosses 22 near the upper end of each scissors bolster, the clearance between the center plate elements being such that no vertical load is applied to the center plate or to the scissors at the center of the car and truck. All the load is carried by the side bearings resting upon the bearing bosses on the bolsters adjacent the truck frames.

The spring plank 6 is limited in longitudinal movement across the truck by inner stop blocks 23 and outer stop blocks 24 which permit a very limited horizontal movement of the spring plank with respect to the truck frame. Since the pivot pins 10 are fixed in position on the spring plank, the horizontal distance between them cannot change. As the upper spring supported end of the bolsters moves up and down, the distance between the line of intersection of the two bolster sections and the pivot pins must vary. To permit this center pin 12 is socketed in a cylindrical bore 25 in the plank section 5 and is free to move horizontally in an elliptical bore 26 in the section 4. The vertical dimension of the elliptical bore is the same as the diameter of the bore 25.

I claim:

1. A railroad car truck, including windowed side frames, a spring plank extending thereacross into the windows, load bearing springs in the windows, extending upwardly from each end of the spring plank, a pair of bolster half sections, each pivoted at its lower end on the spring plank and extending diagonally upwardly to penetrate one of the windows at its upper end and to rest upon the springs in the windows, a pivot pin extending through the bolster sections where they intersect, a saddle, resting upon at least one of the bolster sections, a center plate carried thereby, flanges extending downwardly from the saddle, slotted to receive and support the entire load of the car on the truck and so positioned as to positively prevent the application of load pressure on the center plate.

2. The device of claim 1 characterized by the fact that a center plate is carried by the saddle, and the saddle interlocks with at least one of the bolster half sections to hold the saddle in position.

3. The device of claim 1 characterized by the fact that the pivot pin loosely engages at least one of the bolster half sections to permit relative angular movement of the sections.

4. The device of claim 1 characterized by the fact that the pivot pin is tightly mounted in one of the half sections and is free to move laterally in the other half section to permit relative angular movement of the sections.

5. The device of claim 1 characterized by the fact that the bolster half sections are bifurcated, are interchangeable and interlock with one another.

6. The device of claim 1 characterized by the fact that that portion of each bolster which carries the bosses and penetrates the window is of substantially the width of the window and has legs extending inwardly and downwardly therefrom, one leg being generally co-extensive with one side of the boss bearing portion of the bolster the other leg being spaced therefrom a distance sufficient to permit penetration of the leg on the other of the other side of the bolster.

References Cited

UNITED STATES PATENTS

| | | | |
|---|---|---|---|
| 317,822 | 5/1885 | McEwen | 105—197 |
| 404,676 | 6/1889 | Blaine | 105—222 XR |
| 1,212,987 | 1/1917 | Morrow | 280—112 |
| 1,237,166 | 8/1917 | Burrmann | 105—203 |
| 1,276,188 | 8/1918 | Dietz | 105—229 |
| 1,588,582 | 6/1926 | Jablow | 105—199 |
| 1,916,145 | 6/1933 | Hedgcock | 105—208 XR |
| 2,053,812 | 9/1936 | Bradshaw | 308—136 XR |
| 2,516,082 | 7/1950 | Spencer | 105—197 XR |
| 2,737,908 | 3/1956 | Williams | 105—227 |
| 2,862,459 | 12/1958 | Miller et al. | 105—208.2 XR |

FOREIGN PATENTS 641,915  2/1937  Germany.

ARTHUR L. LA POINT, *Primary Examiner.*

H. BELTRAN, *Assistant Examiner.*